US011913611B2

(12) United States Patent
Avery et al.

(10) Patent No.: US 11,913,611 B2
(45) Date of Patent: Feb. 27, 2024

(54) HYBRID LIGHT TOWER

(71) Applicant: Briggs & Stratton, LLC, Wauwatosa, WI (US)

(72) Inventors: Stephen Bryan Avery, Milwaukee, WI (US); Brian Brunelli, Franklin, WI (US); Dave Jones, Holdrege, NE (US); Andrew Grasz, Holdrege, NE (US); Cole Booth, Holdrege, NE (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 0 days.

(21) Appl. No.: 17/966,611

(22) Filed: Oct. 14, 2022

(65) Prior Publication Data

US 2023/0120493 A1 Apr. 20, 2023

Related U.S. Application Data

(60) Provisional application No. 63/256,202, filed on Oct. 15, 2021.

(51) Int. Cl.
*F21L 14/04* (2006.01)
*F21V 21/22* (2006.01)
*F21W 131/10* (2006.01)

(52) U.S. Cl.
CPC .............. *F21L 14/04* (2013.01); *F21V 21/22* (2013.01); *F21W 2131/10* (2013.01)

(58) Field of Classification Search
CPC ...... F21L 14/04; F21V 21/22; F21W 2131/10
See application file for complete search history.

(56) References Cited

U.S. PATENT DOCUMENTS

| | | | |
|---|---|---|---|
| 3,856,639 | A | 12/1974 | Rohn et al. |
| 5,130,658 | A | 7/1992 | Bohmer |
| 6,003,257 | A | 12/1999 | Stokes |
| 6,464,196 | B1 | 10/2002 | Crookham et al. |
| 6,522,361 | B2 | 2/2003 | Higuchi et al. |
| 7,241,223 | B1 | 7/2007 | Caudill |
| 7,621,650 | B2 | 11/2009 | Nalitchaev et al. |
| 7,667,341 | B2 | 2/2010 | Serdynski et al. |
| 7,701,101 | B2 | 4/2010 | Al-Khayat et al. |
| 8,439,534 | B1 | 5/2013 | Roe et al. |

(Continued)

FOREIGN PATENT DOCUMENTS

| | | | |
|---|---|---|---|
| CA | 2952407 | A1 * | 6/2018 |
| EP | 1 661 232 | | 5/2006 |

(Continued)

*Primary Examiner* — Anne M Hines
(74) *Attorney, Agent, or Firm* — Foley & Lardner LLP

(57) ABSTRACT

A hybrid light tower includes an engine, a permanent magnet generator configured to be driven by the engine, a battery pack including a plurality of lithium-ion battery cells, an extendible mast configured to move between a lowered position and a raised position, and a light assembly including a plurality of light emitting diodes. The generator is configured to produce a first DC power. The battery pack is directly electrically coupled to the generator to receive the first DC power from the generator to charge the battery pack. The light assembly is coupled to the mast and the light emitting diodes electrically coupled to the battery pack to receive a second DC power from the battery pack. The light tower does not include a battery charger connected to the battery pack.

20 Claims, 8 Drawing Sheets

(56) References Cited

U.S. PATENT DOCUMENTS

| | | | |
|---|---|---|---|
| 8,821,304 | B2 | 9/2014 | Ensing |
| 9,039,231 | B1 | 5/2015 | Barker et al. |
| 9,115,879 | B1 | 8/2015 | Barker et al. |
| 9,398,764 | B2 | 7/2016 | Trout |
| 9,428,100 | B2 | 8/2016 | Sharpley et al. |
| 9,484,602 | B1 | 11/2016 | Podolefsky |
| 9,588,185 | B2 | 3/2017 | Champlin |
| 9,624,891 | B2 | 4/2017 | Koenen et al. |
| 9,726,135 | B2 | 8/2017 | Zeiler et al. |
| 9,791,118 | B2 | 10/2017 | Carpoff |
| 9,810,387 | B2 | 11/2017 | Knodel |
| 9,923,249 | B2 | 3/2018 | Rejman et al. |
| 9,955,553 | B2 | 4/2018 | Fletcher |
| 9,989,230 | B2 | 6/2018 | Yamamoto |
| 10,393,324 | B1 | 8/2019 | Chambers |
| 10,400,732 | B2 | 9/2019 | Harvey et al. |
| 10,401,006 | B2 | 9/2019 | Kennedy |
| 10,442,481 | B2 | 10/2019 | Podolefsky |
| 10,634,122 | B1 | 4/2020 | Clifton et al. |
| 2004/0170022 | A1 | 9/2004 | Yoshimori et al. |
| 2005/0063189 | A1 | 3/2005 | Ossolinski |
| 2007/0252552 | A1 | 11/2007 | Walrath |
| 2008/0232082 | A1 | 9/2008 | Martinez |
| 2009/0284963 | A1 | 11/2009 | Intravatola |
| 2010/0020267 | A1 | 1/2010 | Kobayashi et al. |
| 2010/0187375 | A1 | 7/2010 | Yoshimori et al. |
| 2010/0220489 | A1 | 9/2010 | Konop |
| 2012/0039049 | A1 | 2/2012 | Mukouyama |
| 2012/0168576 | A1 | 7/2012 | Intravatola |
| 2012/0201015 | A1 | 8/2012 | Robertson et al. |
| 2012/0201016 | A1 | 8/2012 | Robertson et al. |
| 2013/0039049 | A1 | 2/2013 | Jones et al. |
| 2013/0193856 | A1 | 8/2013 | Chalmers et al. |
| 2013/0250561 | A1 | 9/2013 | Knodel |
| 2013/0301253 | A1 | 11/2013 | Drever |
| 2013/0322073 | A1 | 12/2013 | Hamm et al. |
| 2014/0240968 | A1 | 8/2014 | Brown |
| 2014/0347873 | A1 | 11/2014 | Robertson et al. |
| 2015/0023017 | A1 | 1/2015 | Smith et al. |
| 2015/0061498 | A1 | 3/2015 | Paffrath et al. |
| 2015/0152998 | A1 | 6/2015 | Intravatola |
| 2015/0171632 | A1 | 6/2015 | Fry et al. |
| 2015/0215587 | A1 | 7/2015 | Carpoff |
| 2015/0330558 | A1 | 11/2015 | Intravatola |
| 2016/0186945 | A1 | 6/2016 | Knodel |
| 2016/0281938 | A1 | 9/2016 | Carpoff |
| 2016/0309566 | A1 | 10/2016 | Fletcher |
| 2017/0023191 | A1 | 1/2017 | Magnotta |
| 2017/0031085 | A1 | 2/2017 | Lim et al. |
| 2017/0306916 | A1 | 10/2017 | Zeiler et al. |
| 2018/0058646 | A1 | 3/2018 | Lai |
| 2018/0119935 | A1 | 5/2018 | Proeber et al. |
| 2018/0128435 | A1 | 5/2018 | Workman et al. |
| 2018/0172266 | A1 | 6/2018 | Folk et al. |
| 2018/0192580 | A1 | 7/2018 | Zeiler et al. |
| 2018/0231223 | A1 | 8/2018 | Rau |
| 2018/0266637 | A1 | 9/2018 | Curlett et al. |
| 2018/0367096 | A1 | 12/2018 | Mccormack |
| 2019/0001007 | A1 | 1/2019 | Lyslo et al. |
| 2019/0032867 | A1 | 1/2019 | Flesch et al. |
| 2019/0069378 | A1 | 2/2019 | Dressel et al. |
| 2019/0160972 | A1 | 5/2019 | Zeiler et al. |
| 2019/0178220 | A1 | 6/2019 | Zeiler et al. |
| 2019/0214937 | A1 | 7/2019 | Schmidt |
| 2019/0217319 | A1 | 7/2019 | Harvey et al. |
| 2019/0230850 | A1 | 8/2019 | Johnson et al. |
| 2019/0296290 | A1 | 9/2019 | Hansen et al. |
| 2019/0304266 | A1 | 10/2019 | Fayfield |
| 2019/0309915 | A1 | 10/2019 | Harknett et al. |
| 2019/0346122 | A1 | 11/2019 | Proeber et al. |
| 2019/0353128 | A1 | 11/2019 | Harvey et al. |
| 2020/0232597 | A1 | 7/2020 | Sharrah et al. |
| 2020/0248471 | A1 | 8/2020 | Chambers et al. |
| 2020/0366125 | A1 | 11/2020 | Chen |

FOREIGN PATENT DOCUMENTS

| | | | |
|---|---|---|---|
| EP | 3 001 777 A1 | 3/2016 | |
| EP | 3 208 517 A1 | 8/2017 | |
| GB | 2 491 421 | 12/2012 | |
| WO | WO-2006/047836 | 5/2006 | |
| WO | WO-2010/042081 | 4/2010 | |
| WO | WO-2018/031719 A1 | 2/2018 | |
| WO | WO-2019/035021 | 2/2019 | |
| WO | WO-2019/075316 | 4/2019 | |
| WO | WO-2019/084619 A1 | 5/2019 | |
| WO | WO-2019/213407 A1 | 11/2019 | |

* cited by examiner

HYBRID LIGHT TOWER

CROSS-REFERENCE TO RELATED PATENT APPLICATIONS

This application claims the benefit of and priority to U.S. Provisional Patent App. No. 63/256,202, filed Oct. 15, 2021, the entire disclosure of which is incorporated by reference herein.

BACKGROUND

Conventional portable light towers typically include one or more lights attached to a movable base.

SUMMARY

At least one embodiment relates to a hybrid light tower. The hybrid light tower includes an engine, a permanent magnet generator configured to be driven by the engine, a battery pack including a plurality of lithium-ion battery cells, an extendible mast configured to move between a lowered position and a raised position, and a light assembly including a plurality of light emitting diodes. The generator is configured to produce a first DC power. The battery pack is directly electrically coupled to the generator to receive the first DC power from the generator to charge the battery pack. The light assembly is coupled to the mast and the light emitting diodes are electrically coupled to the battery pack to receive a second DC power from the battery pack. The light tower does not include a battery charger connected to the battery pack.

Another embodiment relates to a hybrid light tower that includes an engine, a permanent magnet generator configured to be driven by the engine, a battery pack including a plurality of lithium-ion battery cells, a mast, a light assembly including a plurality of light emitting diodes, and a controller in communication with the engine, the battery pack, and the light assembly. The generator is configured to produce a DC power. The light assembly is coupled to the mast and the light emitting diodes are electrically coupled to the battery pack to receive power from the battery pack, the generator, or both the battery pack and the generator. The controller is configured to receive an available power output from the battery pack, determine if the available power output is less than a commanded power consumption of the light assembly, and upon determining that the available power output is less than the commanded power consumption of the light assembly, instruct the engine to increase speed and thereby increase the DC power provided by the generator.

Another embodiment relates to a hybrid light tower that includes an engine, a permanent magnet generator configured to be driven by the engine, a battery pack including a plurality of lithium-ion battery cells, an extendible mast configured to move between a lowered position and a raised position, a light assembly coupled to the mast and including a plurality of light emitting diodes, and a controller in communication with the engine, the battery pack, and the light assembly. The generator is configured to produce a first DC power. The battery pack is directly electrically coupled to the generator to receive the first DC power from the generator to charge the battery pack. The controller is configured to selectively supply a second DC power to the light emitting diodes from the battery pack, the generator, or both the battery pack and the generator.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring to the FIGURES generally, the various exemplary embodiments disclosed herein relate to systems, apparatuses, and methods for a hybrid lighting system. The lighting system includes a light tower having a base, an engine coupled to the base and configured to drive a permanent magnet generator, a battery pack coupled to the base, a mast extending laterally from the base, one or more lights coupled to the mast a one or more wheels coupled to the base, and a control system coupled to the base. The battery pack includes a one or more lithium-ion battery cells that are configured to provide power to the lighting system. The light tower does not include a charger coupled to the battery pack, rather the battery pack is directly electrically coupled to the generator.

The control system includes a controller operably coupled to the engine, the battery pack and the lights. The control system is further operably coupled to an engine control module, a battery control module and a light control module, where the engine control module, the battery control module and the light control module determine a status of the engine, the battery pack and the lights and provide that status back to the controller. With the received status data, the controller may command the lighting system to perform various actuations to maximize or control a runtime of the light tower.

Figure 1:
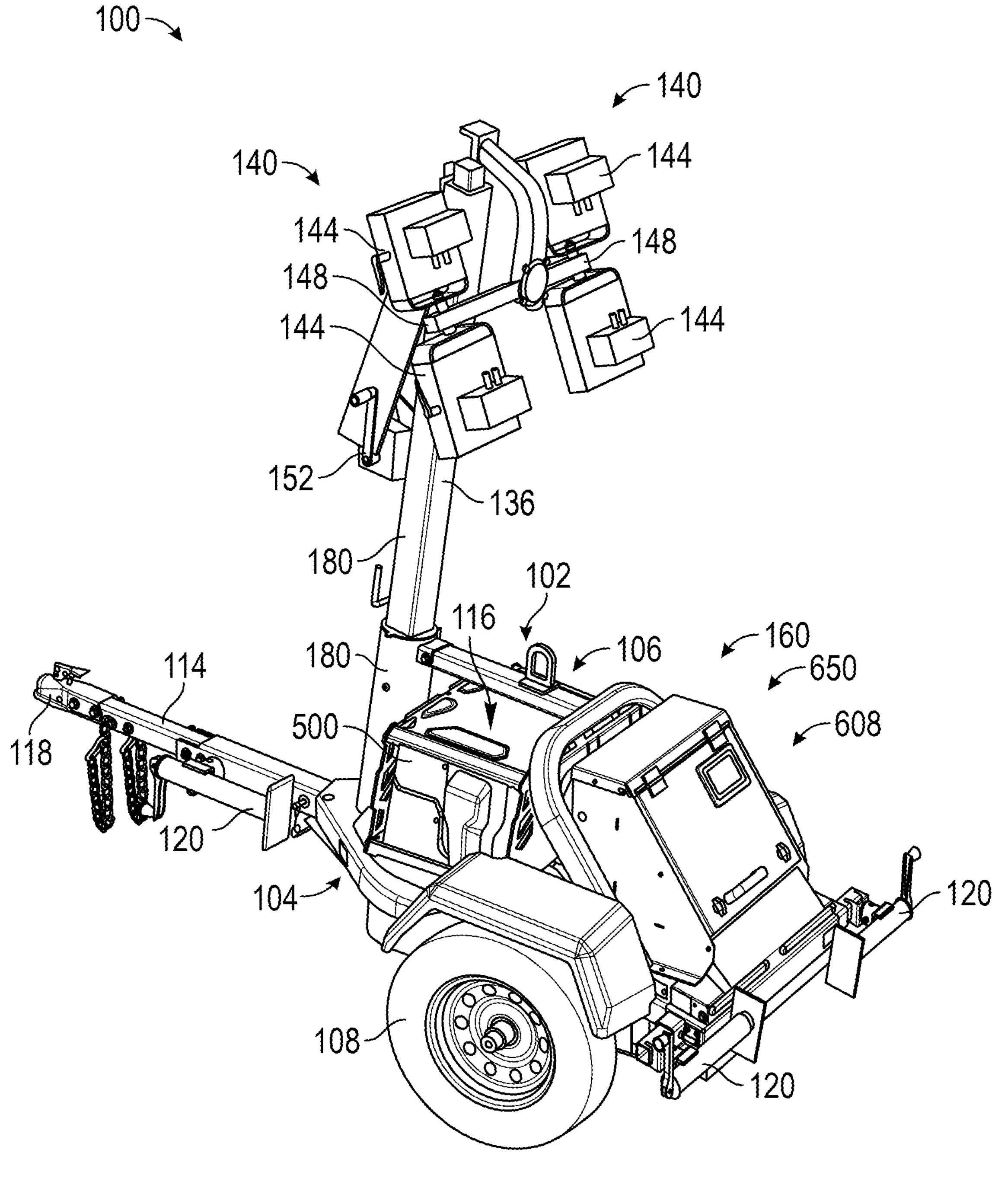
FIG. 1 is a perspective view of a light tower, according to an exemplary embodiment.
Figure 2:
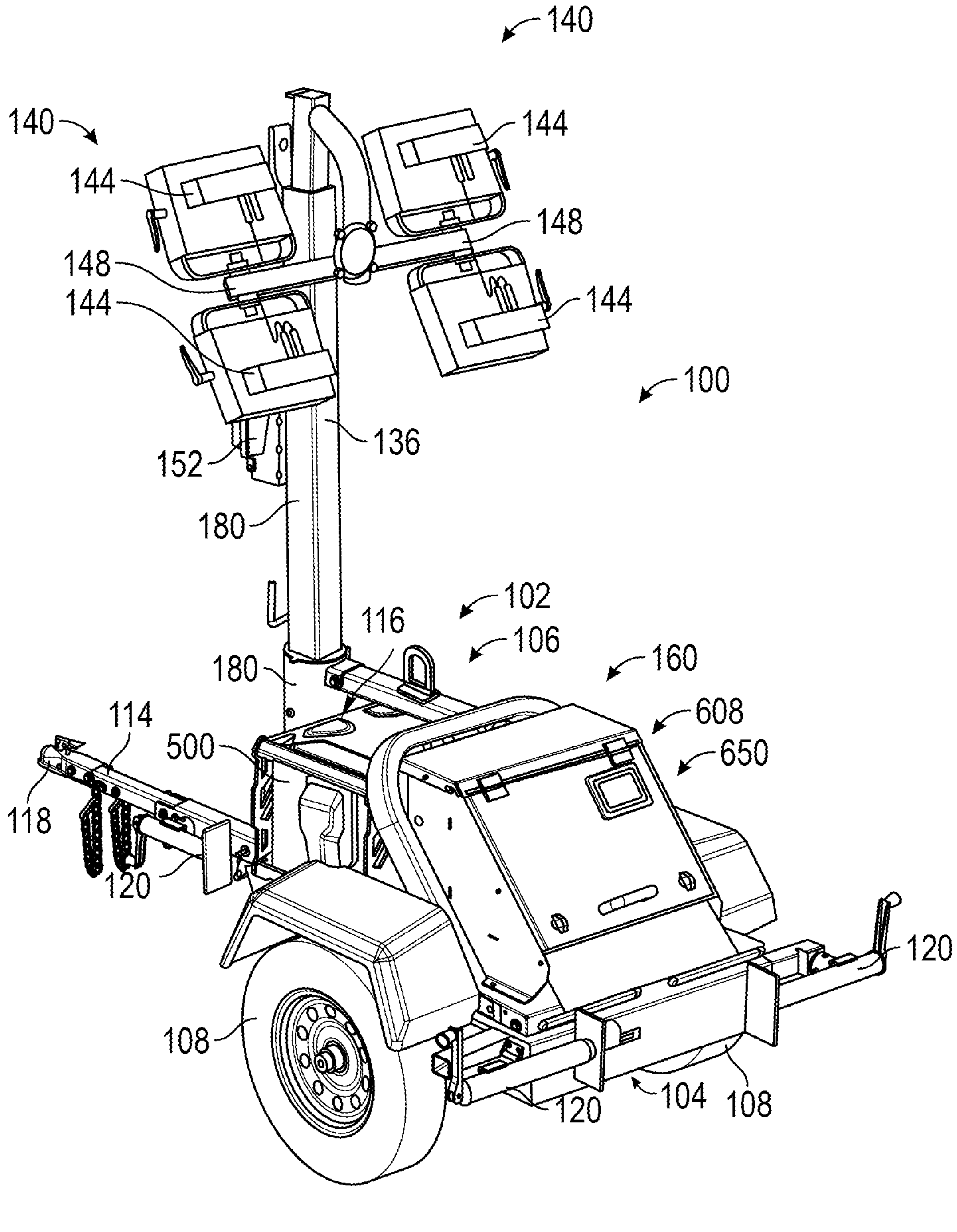
FIG. 2 is another perspective view of the light tower of FIG. 1.

Referring now to FIGS. 1 and 2, a portable lighting tower, hybrid lighting tower, towable lighting tower, or lighting tower, shown as light tower 100 is shown, according to an exemplary embodiment. The light tower 100 includes a chassis or base, shown as frame 104, having multiple wheels 108, and one or more battery housings 116. The frame 104 provides a base structure for many components of the light tower 100, and physically decouples the many components of the light tower 100 from the ground. According to an exemplary embodiment, the frame 104 defines a longitudinal axis. The longitudinal axis may be generally aligned with a frame arm 114 of the frame 104 of the light tower 100 (e.g., front-to-back, etc.).

To make the light tower 100 portable, the frame 104 includes tractive elements, shown as wheels 108. The wheels 108 lift the frame 104 off of the ground and allow the light tower 100 to be easily moved. The wheels 108 may be any type of wheels including simple caster wheels and larger wheels including a tire and a rim. As shown in FIG. 1, the light tower 100 includes two tire and rim wheels 108 positioned opposite one another and coaxially aligned along an axle. The frame 104 further includes an arm, a rail, a tongue, etc., shown as frame arm 114 extending outward from the frame 104. The frame arm 114 may be fixedly coupled to the frame 104, where the frame arm 114 is centrally disposed along a central plane of the frame 104. The frame arm 114, may be selectively coupled to a hitch, a tongue, or the like, shown as tongue 118. The tongue 118 may be positioned distal the wheels 108. In some embodiments, the tongue 118 may be positioned proximate the wheels 108. The tongue 118 may receive a hitch, ball, etc. to allow the user to selectively reposition the light tower 100. By way of example, the light tower 100 may be lowered onto a hitch, where the user may then exert a push or pull force onto the light tower 100 to move the light tower 100 in a desired direction (e.g., via a vehicle, via a motored device, via a user, etc.). In some embodiments, the light tower 100 may be moved within a work site. In still some embodiments, the light tower 100 may be moved between one or more work sites. The tongue 118 may be selectively movable between a tow position and a storage position. When in the tow position, the tongue 118 is positioned substantially horizontal. When in the storage position, the tongue 118 is positioned substantially vertical position to free up space.

The light tower 100 further includes a powertrain system. The powertrain system includes a primary driver, shown as engine 102, coupled to and supported by the frame 104. The engine 102 may receive fuel (e.g., gasoline, diesel, etc.) from a fuel tank and combust the fuel to generate mechanical energy. The fuel tank may include a fuel level sensor positioned within the fuel tank, where the fuel level sensor provides a fuel status (e.g., level of the fuel in the fuel tank, etc.). The mechanical energy from the engine 102 may then be supplied to many components of the light tower 100.

The powertrain system further includes a permanent magnet generator 106 coupled to the engine 102. The permanent magnet generator 106 may further be driven by the engine 102, where the permanent magnet generator 106 converts the mechanical energy generated by the engine 102 into electrical energy. By way of example, the permanent magnet generator 106 generates direct current power (DC power) that may be supplied directly to a battery pack and to the lights 144. In some embodiments, the engine 102 and the permanent magnet generator 106 are formed as a single component (e.g., a motor/generator) and supported on the frame 104.

According to an exemplary embodiment, the light tower 100 may include a separate drive system coupled to the frame 104. The drive system may be selectively coupled to the frame when repositioning the light tower 100 between job sites. In some embodiments, the drive system may be selectively coupled to the light tower 100 when traveling over a maximum speed (e.g., greater than 10 mph, 20 mph, 30, mph, 50 mph, etc.). The drive system may be selectively coupled to the frame 104 via a fastening device (e.g., fastener, bracket, etc.). In some embodiments, the drive system is fixedly coupled to the frame 104 and the drive system is deployable between a raised position and a lowered position.

According to an exemplary embodiment, the light tower 100 may include one or more solar panels electrically coupled to a battery pack 500. The one or more solar panels may include a converter configured to convert AC current to DC current. The one or more solar panels are configured to provide a DC current to the battery pack 500. As can be appreciated, the one or more solar panels may provide sufficient DC current to the battery pack 500 to charge the battery pack 500. In some embodiments, the one or more solar panels may provide DC current when the light tower 100 has insufficient current to operate at least the lights 144.

According to an exemplary embodiment, the light tower 100 may be coupled to one or more other light towers, where the other light towers are similar to that of the light tower 100. By way of example, the one or more light towers may be coupled via a power output, Bluetooth, WiFi, or the like. The light tower 100 may be of a master light tower, where the one or more other light towers are slave light towers configured to mimic the master light tower. The light tower 100 may be a central light tower configured to send commands to the one or more other light towers.

According to an exemplary embodiment, the light tower 100 may be coupled to a satellite platform. In some embodiments, the satellite platform may be an individual battery trailer electrically coupled to the battery pack 500 for increased battery storage. In still some embodiments, the satellite platform may hold accessory components to the light tower 100.

In general, the battery pack 500 is supported on the frame 104 and at least partially enclosed within a battery housing 116. In some embodiments, the battery pack 500 is removably coupled to the frame 104 to allow the battery pack 500 to be changed with another battery pack 500. For example, the battery housing 116 may include a quick connector that holds the battery pack 500 in place during operation of the light tower 100. The quick connector may then be actuated (e.g., moved, opened, driven, operated) to allow the battery pack 500 to be decoupled from the battery housing 116. In this way, for example, a mounted battery pack 500 can be switched with a new battery pack 500 in case the mounted battery pack 500 needs to be charged, goes bad, or needs to be changed for various other reasons. In some embodiments, the battery pack 500 removably couples to the respective battery housing 116 through one or more fasteners (e.g., a bolt). In even other embodiments, a frame of the battery pack 500 includes a male connector (e.g., a plastic extension, a threaded end) that connects into a female connector (e.g., a slit, an opening, a threaded hole) of the battery housing 116. In even other embodiments, the battery pack 500 removably couples to the battery housing 116 through an electrical connection (e.g., one or more wires, a male electrical connection). In some embodiments, the engine 102, the permanent magnet generator 106, and the battery pack 500 are at least partially enclosed within the battery housing 116.

In some embodiments, the battery pack 500 is arranged in front of the wheels 108 on the frame 104 (e.g., from the perspective of FIG. 2) to balance the weight acting on the frame 104. In other words, the battery pack 500 may be arranged longitudinally between the frame arm 114 and the wheels 108. The battery pack 500 may include a one or more lithium-ion battery cells. In some embodiments, the battery pack 500 may include one or more battery banks, where the battery banks include one or more lithium-ion battery cells. By way of example, the battery pack 500 may include 10 kW-h (kilowatt-hour) lithium-ion battery cells. In some embodiments, the light tower 100 includes a plurality of battery packs 500 connected in parallel to increase capacity or act as a back-up power source to a primary battery pack 500. The battery pack 500 may be configured to provide DC power to the lights 144. As will be described herein, the permanent magnet generator 106 is configured to supply a first DC power to the battery pack 500 and the battery pack 500 is configured to supply a second DC power to the lights 144.

The frame 104 is coupled to an adjustable mast 136. The adjustable mast 136 is adjustable between a storage configuration and a deployed configuration, and includes one or more light assemblies 140 arranged at a distal end thereof. Each light assembly 140 includes one or more lights 144 and an adjustable frame 148. In one embodiment, each light assembly 140 includes two lights 144. In other embodiments, each light assembly 140 can include more or less than two lights 144. By way of example, the lights 144 may include one or more light emitting diodes (LED). In some embodiments, the lights 144 may be include incandescent lights. In general, the adjustable frame 148 allows the light assembly 140 to be moved and adjusted. For example, each adjustable frame 148 may allow each respective light assembly 140 to be swiveled, rotated about the adjustable mast 136, and moved in any direction (e.g., within the range of the adjustable frame 148). In some embodiments, each adjustable frame 148 allows the light assemblies 140 to be tilted, turned, and even moved. Tilting and turning the light assemblies 140 allow for a user to position a beam of light as desired. In further embodiments, the adjustable frame 148 may be mechanically controlled by an electric motor for tilting and turning of the light assembly 140. The electric motor may be controlled by a controller 608 discussed further herein (e.g., in response to a user input and/or automatic controls based on other gathered signals from the light tower 100).

The adjustable mast 136 may further includes a tower winch 152. The tower winch 152 may be coupled to the adjustable mast 136 and deploys or retracts the adjustable mast 136. In some embodiments, the tower winch 152 may be a winch including a rope or metal wire that deploys or retracts the adjustable mast 136. In other embodiments, the tower winch 152 includes a rope that attaches to the top of the adjustable mast 136 and deploys or retracts the adjustable mast 136 in response to user input.

In some embodiments, the adjustable mast 136 may be lowered and raised between the storage configuration and the deployed configuration. The adjustable mast 136 includes multiple mast sections or members 180 that telescope to raise and lower the adjustable mast 136. For example, when lowering the adjustable mast 136, the top member 180 lowers inside of the middle member 180, both of which lower inside of the bottom member 180, and so on. More or fewer members 180 may be used. In this way, the bottom member 180 has the largest diameter, and the top member 180 has the smallest diameter.

In some embodiments, the engine 102 and the battery pack 500 cooperatively define a power supply. The power supply may be a 1000 watt power supply, where the lights 144 are each configured to utilize up to 250 watts of power. In some embodiments, the power output of the battery pack 500 may be equal to or less than a power supplied by the permanent magnet generator 106 to charge the battery pack 500. In some embodiments, the light tower 100 includes four lights 144, where the four lights 144 collectively draw the 1000 watts of power from the power supply. According to an exemplary embodiment, each of the lights 144 may utilize more than 250 watts of power, where the power supply loses power instead of being charged or maintain a charge level. As can be appreciated, the lights 144 may include a normal maximum operating mode (e.g., where the lights 144 utilize 250 watts of power). According to an exemplary embodiment, the lights 144 may include an increased maximum operating mode (e.g., where the lights 144 utilize 350 watts of power). Changing between the normal operating mode and the increased operating mode may, for example, increase a light intensity of the lights 144.

The light tower 100 includes a user interface 650. The user interface 650 will be described in more detail herein, but includes one or more displays 160. The displays 160 provide a variety of information to a user of the light tower 100, including information on remaining runtime, various settings of the light tower 100, and other relevant information. In some embodiments, the displays 160 are touch screens, graphical user interfaces, or other types of input devices that allow the user to input information and display information to a user.

Figure 3:
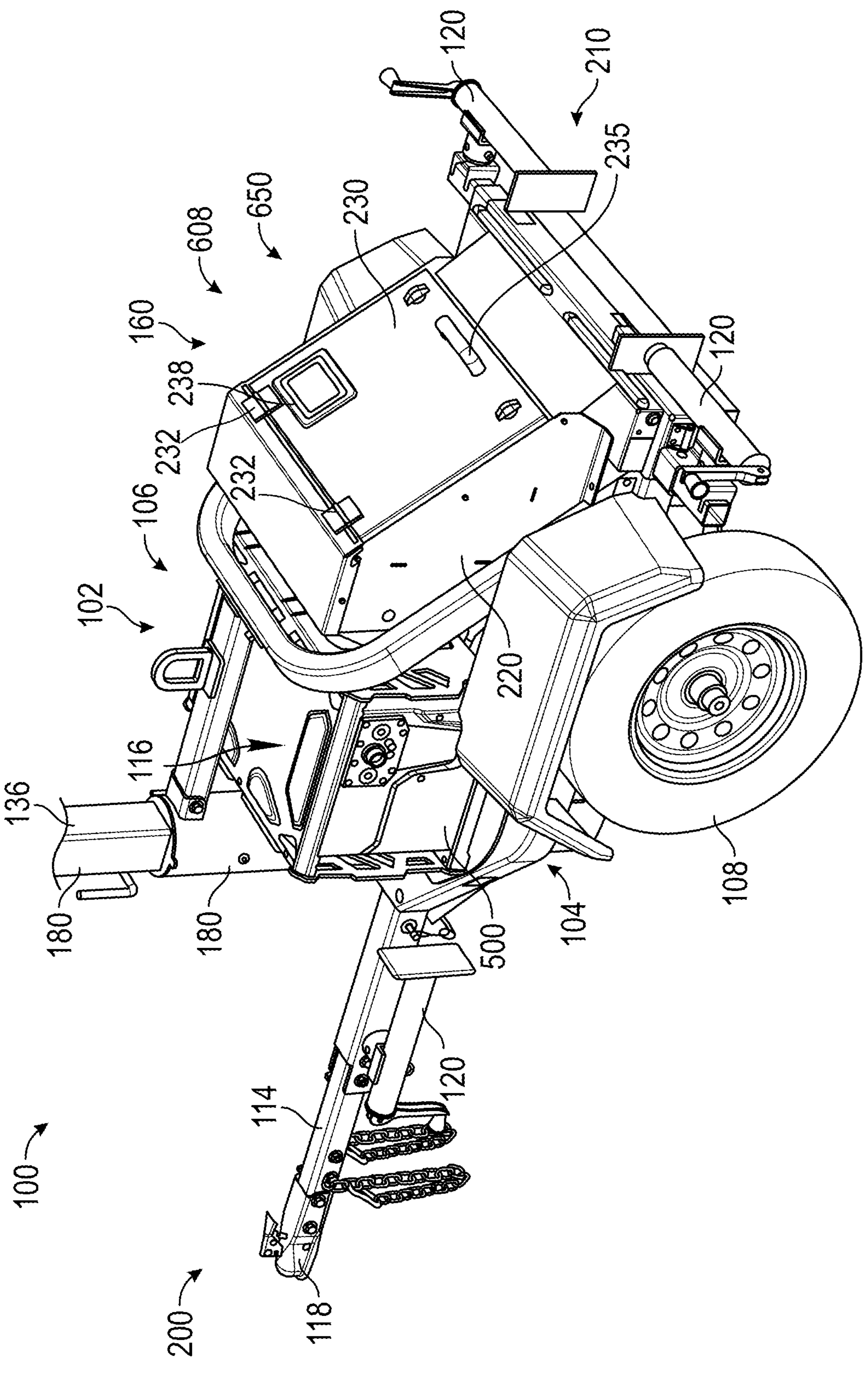
FIG. 3 is a perspective view of a base of the light tower of FIG. 1.
Figure 4:
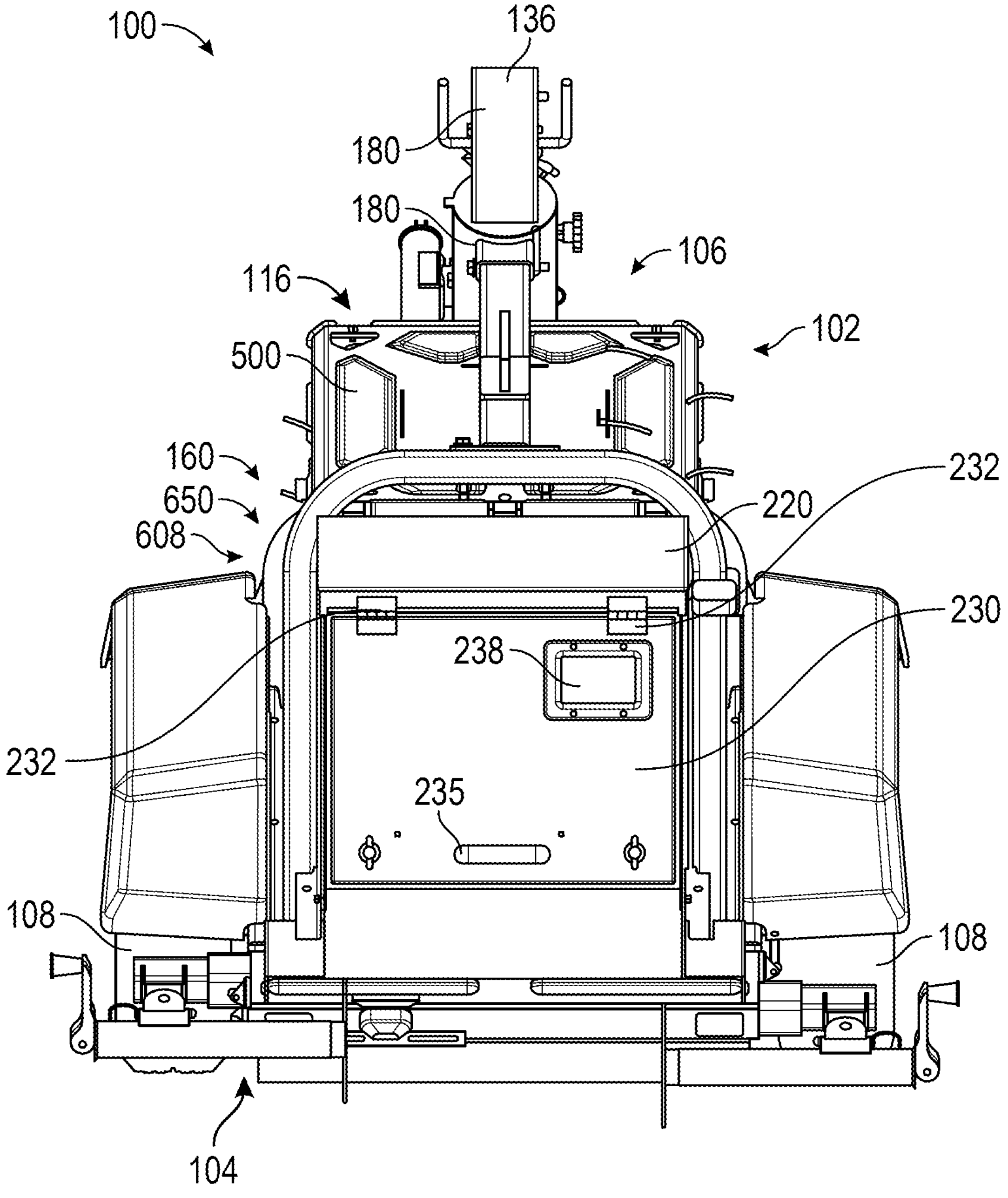
FIG. 4 is a rear view of the base of FIG. 3.

Referring now to FIGS. 3 and 4, the frame 104 includes a first end 200 and a second end 210, the second end 210 positioned opposite the first end 200. The tongue 118 is positioned proximate the first end 200 and the user interface 650 is positioned proximate the second end 210, where the adjustable mast 136 is positioned between (e.g., proximate a midpoint of the frame 104, etc.) between the first end 200 and the second end 210. The user interface 650 is housed within an interface housing 220. The interface housing 220 may be a prismatic structure with the user interface 650 disposed within. In some embodiments, the interface housing 220 may be of any geometrical configuration (e.g., triangular, frustoconical, etc.). The interface housing 220 further includes a lid 230 that is selectively pivotable about a one or more hinges 232. The one or more hinges 232 may be positioned along an upper edge of the interface housing 220. In some embodiments, the hinges 232 may be positioned along any edge of the interface housing 220. The lid 230 is selectively pivotable between an open position (see, e.g., FIG. 5) and a closed position (see, e.g., FIG. 3). Additionally, the lid 230 may be pivotable between the open position and the closed positon to protect the user interface 650 from any elements that may be harmful to the user interface 650 (e.g., abrasion, water, etc.). In the illustrated embodiment, the lid 230 includes a handle 235 that a user may grasp and move the lid 230 between the open position and the closed position. The lid 230 further includes a touch screen or screen, shown as screen 238 located proximate the hinges 232. The screen 238 may be coaxially aligned with the display 160 such that the operator may interface with the display 160 when the lid 230 is in the closed position. That is, an operator may interface with the screen 238 to access the display 160 when the lid 230 is in the closed position.

Figure 5:
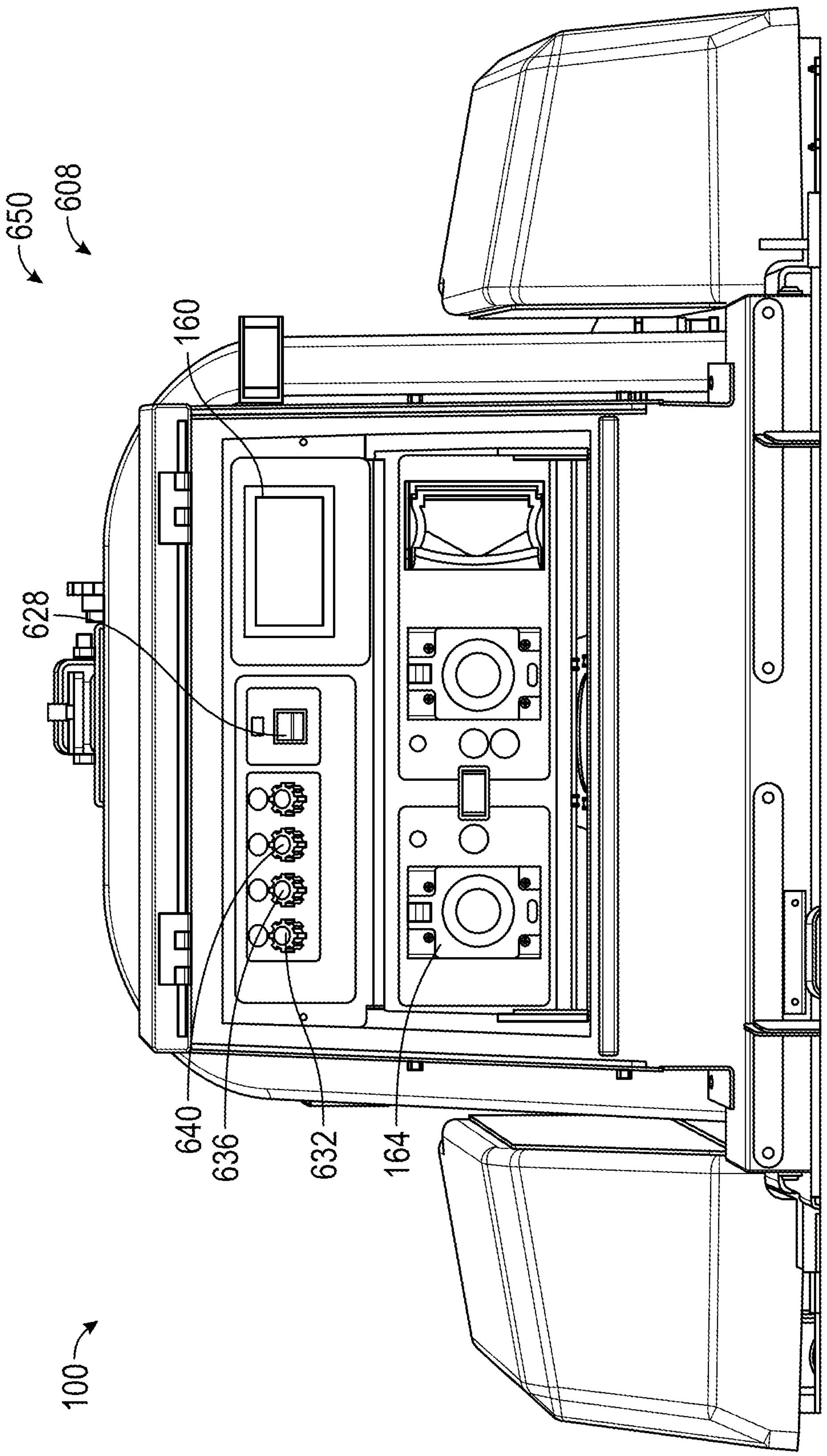
FIG. 5 is a front view of a control system of the light tower of FIG. 1.
Figure 6:
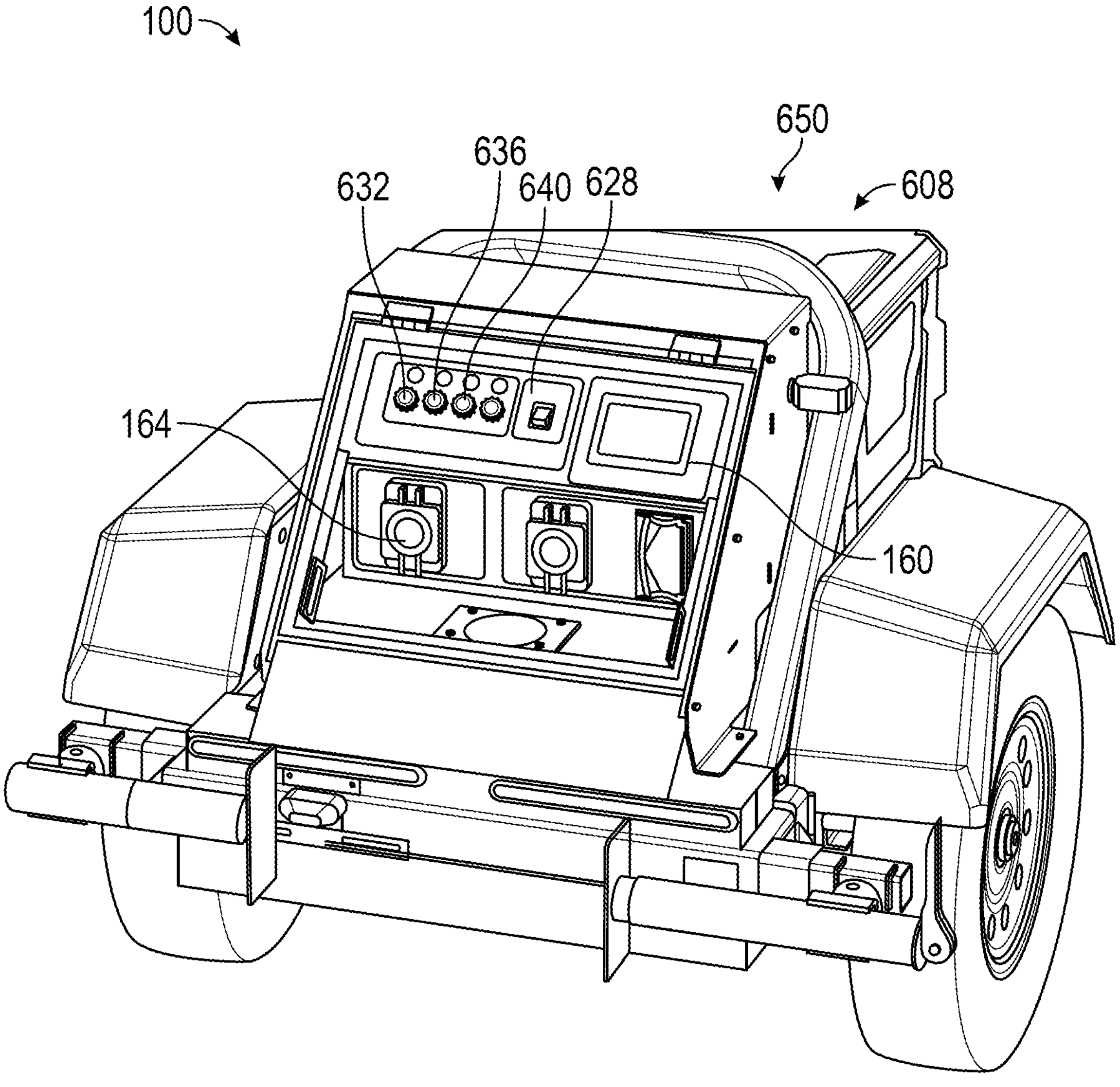
FIG. 6 is a perspective view of the control system of FIG. 5.
Figure 7:
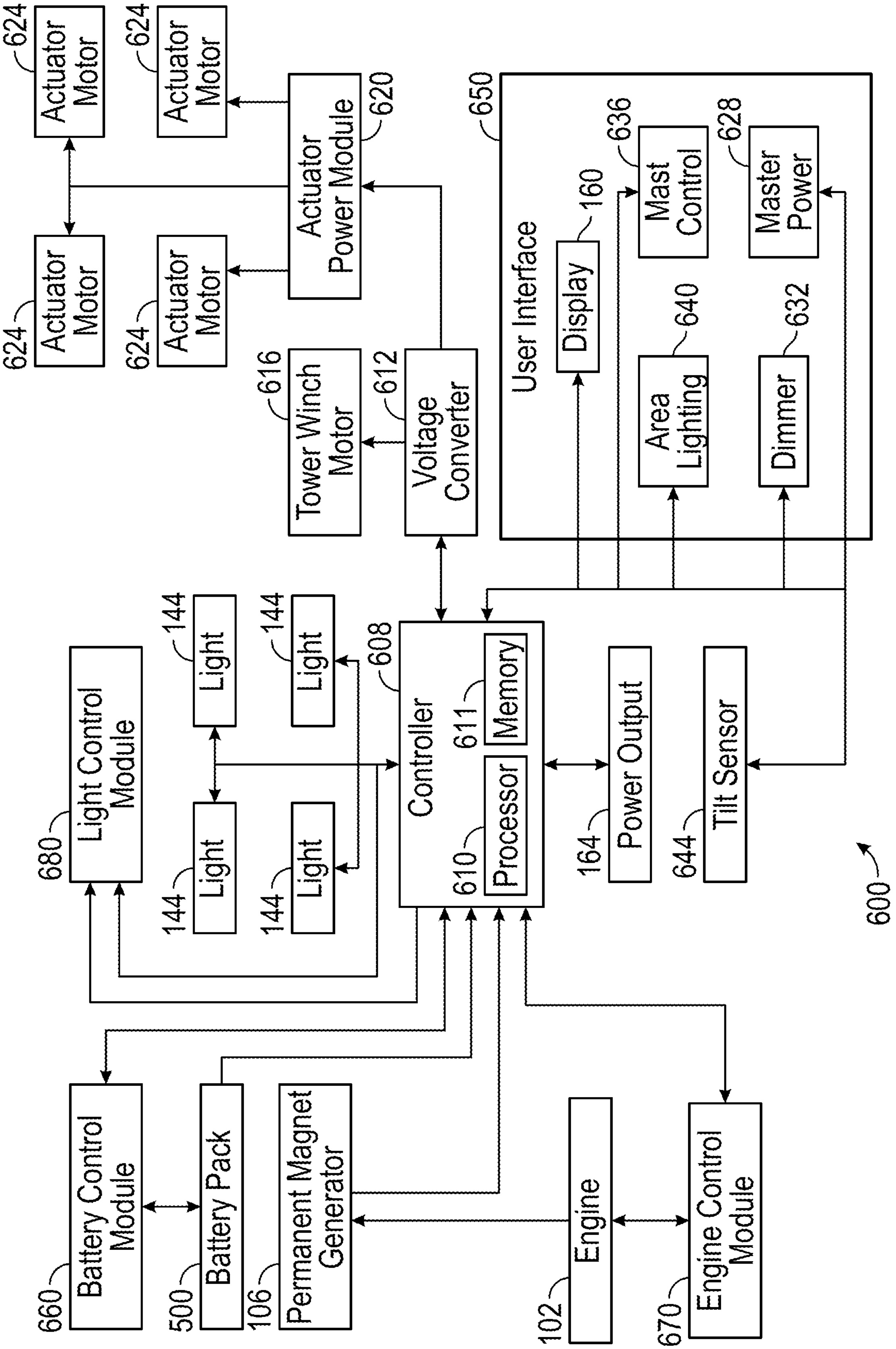
FIG. 7 is a block diagram of an electrical system of the light tower of FIG. 1.

Turning to FIGS. 5-7, the light tower 100 further includes a power output 164. The power output 164 provides the user a location to plug in external devices to receive power from the battery pack 500. For example, the user may plug in external power equipment, more lighting equipment, or other power using equipment. In general, the power output 164 may be included in an electrical system 600 of the light tower 100 (see, e.g., FIG. 7). In general, the connections and arrows between blocks in the electrical system of FIG. 7 may refer to an electrical coupling, a communicative coupling, an operable coupling, a physical coupling, or a combination of one or more these couplings. The electrical system 600 includes the battery pack 500, a controller 608, a voltage converter 612, a tower winch motor 616, a tower actuator power module 620, a plurality of actuator motors 624, the lights 144, a tilt sensor 644, and a user interface 650.

The controller 608 includes a processing circuit including a processor 610 and memory 611. The processing circuit can be communicably connected to a communications interface such that the processing circuit and the various components thereof can send and receive data via the communications interface. The processor 610 can be implemented as a general purpose processor, an application specific integrated circuit ("ASIC"), one or more field programmable gate arrays ("FPGAs"), a group of processing components, or other suitable electronic processing components.

The memory 611 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. The memory 611 can be or include volatile memory or non-volatile memory. The memory 611 can include database components, object code components, script components, or any other type of information structure for supporting the various activities and information structures described in the present application. According to some embodiments, the memory 611 is communicably connected to the processor 610 via the processing circuit and includes computer code for executing (e.g., by the processing circuit and/or the processor 610) one or more processes described herein.

The battery pack 500 may be charged by the permanent magnet generator 106, which receives its power from the engine 102. The battery pack 500 is operably coupled to a battery control module 660. The battery control module 660 may further be operably coupled to the controller 608, where the battery control module 660 may send and receive feedback signals. Specifically, the battery control module 660 may be configured to monitor a status, utilization, etc., of the battery pack 500 and further configured to provide an output command to the controller 608 indicating a status of the battery pack 500 (e.g., an available power output). According to an exemplary embodiment, the controller 608 may command the engine 102 to output a specific power to the permanent magnet generator 106 based on feedback from the battery control module 660. In such an embodiment, the controller 608 may instruct the engine 102 to power the permanent magnet generator 106 to output DC power to achieve the desired output where the battery pack 500 maintains a consistent power output.

In some embodiments, the controller 608 stores control parameters that define a maximum DC power output for the permanent magnet generator 106. In some embodiments, the lithium-ion battery cells in the battery pack 500 have substantially low resistance levels, and the permanent magnet generator 106 includes the control parameters to control the current output to the battery pack 500 for protection. Power from the battery pack 500 is provided to the controller 608 (i.e., the battery pack 500 is electrically coupled to the controller 608). The controller 608 is electrically coupled to a voltage converter 612 and the lights 144. In some embodiments, the voltage converter 612 is configured to change the voltage of the DC power input to the controller 608 from the battery pack 500 to another DC voltage. In some embodiments, the voltage converter 612 converts a DC power input to the controller 608 from the battery pack 500 to AC power.

The engine 102 is operably coupled to an engine control module 670. The engine control module 670 may further be operably coupled to the controller 608, where the engine control module 670 may send and receive feedback signals. Specifically, the engine control module 670 may be configured to monitor a status, utilization, etc., of the engine 102 and further configured to provide an output command to the engine 102 based on feedback from the controller 608. According to an exemplary embodiment, the controller 608 may provide a command to the engine control module 670 for a desired engine output (e.g., output speed, output power, and/or output torque, etc.). For example, if the controller 608 receives feedback for a specific power output provided by the permanent magnet generator 106, the controller 608 may instruct the engine control module 670 to run the engine 102 at a predetermined engine speed that will output the required power from the permanent magnet generator 106. In some embodiments, the controller 608 may determine an engine speed that will meet a runtime requirement.

Referring still to FIGS. 5-7, the controller 608 is configured to control the power to the lights 144. In some embodiments, the amount of light produced by each light 144 is dimmable based on the power received by each light 144. Accordingly, a user may directly adjust the power supplied to the lights 144 based on a variety of factors including required runtime, needed light, and/or time of day. As described further herein, the lights 144 may also be adjusted (e.g., by controller 608) without user input.

The lights 144 are operably coupled to a light control module 680. The light control module 680 may further be operably coupled to the controller 608, where the light control module 680 may send and receive feedback signals. Specifically, the light control module 680 may be configured to monitor a status, utilization, etc., of the lights 144 and further configured to provide an output command to the lights 144 based on feedback from the controller 608. According to an exemplary embodiment, the controller 608 may provide a command to the light control module 680 for a desired light output by adjusting an amount of power provided to each of the lights 144.

In some embodiments, a brightness of the lights 144 may be automatically controlled by the controller 608. In one such embodiment, a user may input a required (or desired) runtime of the lights 144. To meet an input runtime (e.g., input to the display 160), the controller 608 may regulate the power output to by the lights 144, thereby controlling the light output (e.g., brightness) of the lights 144. Using automatically-dimmable lights, the runtime of the light tower 100 can be greatly increased (e.g., from approximately 2 hours of runtime to 12 hours of runtime on a low setting (about 30% power relative to the highest setting)). As the lights 144 are dimmable between a maximum setting and a minimum setting, a user can finely control the amount of light being produced by the lights 144.

The tower winch motor 616 and the actuator power module 620 are both electrically coupled to the battery pack 500 to receive power therefrom. In some embodiments, the tower winch motor 616 is an electric motor coupled to the tower winch 152, and provides power to the tower winch 152 to deploy or retract the adjustable mast 136. The actuator power module 620 receives power from the voltage converter 612 and powers the plurality of actuator motors 624. In one embodiment, the actuator power module 620 is a controller that controls the positioning of each actuator motor 624 based on feedback from the controller 608. In further embodiments, the actuator power module 620 is a power hub that receives communicable signals from the controller 608 to control the positioning of each actuator motor 624. Each actuator motor 624 is an electric motor located within a linear actuator. Each actuator motor 624 actuates a respective linear actuator and thereby moves a respective support 120. Both the tower winch motor 616 and the actuator motors 624 may be controllable between an infinite number of positions between full extension (e.g., fully deployed) and full contraction (e.g., fully stored). In this way, the controller 608 can finely control the positioning and speed of the actuator motors 624 and the tower winch motor 616.

In some embodiments, the controller 608 is configured to receive user input from the user interface 650 and is communicably and electrically coupled to the display 160, a master power switch 628, a dimmer knob (i.e., dimmer control) 632, a deploy/retract button (i.e., deploy/retract control) 636, an area lighting 640, and a tilt sensor 644. The master power switch 628 is communicably and/or electrically coupled to the controller 608 and/or the battery pack 500 to control power output to the light tower 100. In one embodiment, the master power switch 628 is an on/off switch. When in an "on" position, components of the electrical system 600 (e.g., the lights 144, the controller 608, and/or an actuator power module 620) receive power from the battery pack 500. When in an "off" position, the components of the electrical system 600 (e.g., the lights 144, the controller 608, and/or the actuator power module 620) does not receive power from the battery pack 500. In some embodiments, the master power switch 628 is an electrical gate that physically cuts power off from the battery pack 500 when in an "off" position and electrically couples the battery pack 500 to the controller 608 when in an "on" position.

The dimmer knob 632 is communicably coupled to the controller 608 to control the light output of the lights 144. In one embodiment, the dimmer knob 632 is a physical knob that is adjustable between a full-on setting and a full-off setting. The full-on setting indicating a maximum amount of light output (e.g., a maximum brightness) of the lights 144 and a full-off setting indicating a minimum amount of light output (e.g., a minimum brightness or no brightness) of the lights 144. In another embodiment, the dimmer knob 632 is an adjustable digital control on the display 160. In any case, a user can adjust the dimmer knob 632 to a specified light output of the lights 144. In some embodiments, the user interface 650 includes a plurality of dimmer knobs 632, one for every light assembly 140.

The deploy/retract button 636 is communicably coupled to the controller 608 to control both the tower winch motor 616 and the actuator motors 624. As will be described further herein, the deploy/retract button 636 may provide a single button that changes the configuration (e.g., deploys or retracts) the light tower 100. In one embodiment, the deploy/retract button 636 is a push button the user must hold to change the configuration (e.g., deployed or stored) of the light tower 100. The deploy/retract button 636 may communicate a selection or input to the controller 608, which may then command all of the actuator motors 624 to operate. Once fully deployed or retracted, the controller 608 may then command the tower winch motor 616 to operate and raise/lower the adjustable mast 136. If during any time, the user takes their finger/hand off the deploy/retract button 636, this may be communicated to the controller 608 and all operation of the tower winch motor 616 and/or the actuator motors 624 will be stopped. In some embodiments, the deploy/retract button 636 may also level the supports 120 to provide an even lighting setup. In this way, the controller 608 may communicate with a tilt sensor 644 to receive tilt indications or signals. In some embodiments, the tilt sensor 644 is an accelerometer or gyroscope sensor configured to determine position of the tilt sensor 644 relative to horizontal (e.g., relative to a direction substantially perpendicular to the force of gravity). In another embodiment, the tilt sensor 644 is a position sensor that determines the location of the light tower 100 relative to horizontal such as an eddy-current sensor, a Hall Effect sensor, an inductive sensor, a Piezoelectric transducer, or a potentiometer.

The area lighting 640 may include one or more lights that provide lighting to the user of the user interface 650 before the lights 144 are turned on. In some embodiments, when the master power switch 628 is turned "on", the area lighting 640 receives power to light up the user interface 650 for the user. In some embodiments, the area lighting 640 is selectively controlled by a user, which enables the user to selectively turn off and on the area lighting 640 when needed to save power and maximize runtime of the light tower 100. In some embodiments, the area lighting 640 is supplemented by user interface lighting. The area lighting 640 providing light to the area around the light tower 100, and the user interface lighting providing power directly to the user interface 650. In some embodiments, the area lighting 640 includes a proximity or motion sensor, where a user is detected upon approach to the light tower 100 such that the user interface 650 or area surrounding the user interface 650 lights up once a user approaches.

The display 160 is communicably and electrically coupled to the controller 608. The display 160 can act as a user input/output device. Accordingly, the display 160 provides a variety of information to a user of the light tower 100 including information on remaining runtime, various settings of the light tower 100, and other relevant information. In some embodiments, the display 160 is a touch screens that allow the user to input information through touch. For example, the controls of the user interface 650 described herein (e.g., the deploy/retract button 636, the dimmer knob 632, the area lighting 640) may be graphical buttons located on the display 160. In this way, the user can receive information from the display 160 and provide information to the display 160.

According to an exemplary embodiment, the light tower 100 may include power electronics operably coupled to at least the permanent magnet generator 106 and the controller 608. Power electronics may be one of an inverter, a motor controller, a voltage converter, etc. In some embodiments, the power electronics may be a first inverter configured to output AC power (e.g., 120 Volts AC (VAC)) and a second inverter configured to output DC power (e.g., an output range of 40-56 Volts DC (VDC)). In some embodiments, the power electronics may be an inverter configured to output DC power (e.g., an output range of 40-56 Volts DC (VDC)). The permanent magnet generator 106 may produce a higher output voltage than what the battery pack 500 can consume, and the power electronics may be configured to control a voltage and current of a DC power output by the permanent magnet generator 106 that is suitable for the battery pack 500.

In some embodiments, the engine 102 may vary the engine speed (e.g., based on input from the controller 608) to increase or decrease a power output from the permanent magnet generator 106 and the power electronics (e.g., an inverter) coupled thereto. For example, during operation of the light tower 100, the controller 608 is configured to receive a signal from the battery control module 660 that communicates an available power output from the battery pack 500. The controller 608 also receives a load (e.g., a commanded power consumption) required to operate the lights 144 at a desired output (e.g., brightness) from the light control module 680. If the controller 608 determines that the commanded power required by the lights 144 is less than or equal to the available power output of the battery pack 500, the controller 608 may maintain the engine 102 at a present speed. In some embodiments, in this operating condition, a portion of the power output by the permanent magnet generator 106 is supplied directly to the battery pack 500 to charge the battery pack 500. In this way, for example, the light tower 100 is operable without a battery charger for the battery pack 500 (i.e., the light tower 100 does not include a battery charger). Rather, the DC power (e.g., a first DC power) output by the permanent magnet generator 106 is supplied directly to the battery pack 500 for charging. If the controller 608 determines that the power required by the lights 144 is greater than the available power output of the battery pack 500, the controller 608 may increase a speed of the engine 102 to increase a power output from the permanent magnet generator 106. The increased power output from the permanent magnet generator 106 may power the lights 144 and/or charge the battery pack 500.

In some embodiments, the controller 608 is configured to selectively turn off the engine 102 to run the light assemblies 140 with the battery pack 500. For example, if the controller 608 determines that the available power output of the battery pack 500 is greater than the commanded power required by the lights 144, the controller 608 may instruct the engine 102 to turn off and power the lights solely with the battery pack 500. Alternatively, if the controller 608 determines that the available power output of the battery pack 500 is less than the commanded power required by the lights 144, the controller 608 may instruct the battery pack 500 to stop supplying output power (e.g., the second DC power) to the lights 144 and power the lights 144 solely with the engine 102 and the permanent magnet generator 106.

In general, the lights 144 are configured to receive DC power from the battery pack 500 (e.g., a second DC power) and/or the permanent magnet generator 106. In some embodiments, the controller 608 is configured to selectively control the components that output power to the lights 144. For example, the controller 608 may be configured to supply a second DC power to the lights 144 from the battery pack 500, the generator 106, or both the battery pack 500 and the generator 106. With the light 144 being powered by DC power, and the battery pack 500 being configured to output DC power, the number of components on the light tower 100 is reduced when compared to conventional light towers. Additionally, with the permanent magnet generator 106 being configured to output DC power directly to (i.e., with no battery charger in between) the battery pack 500, the light tower 100 does not require power conversion (e.g., between DC/AC) to facilitate charging the battery pack 500 and operating the lights 144. This electrical architecture provided by the light tower 100 provides efficient operation with a longer life and runtime when compared to conventional light towers, and reduces the number of components on the light tower 100 (e.g., supported on the frame 104), which reduces the weight and improves serviceability. In some embodiments, the light tower 100 does not include an AC/DC converter/inverter.

According to an exemplary embodiment, the controller 608 may be operably coupled to a user device (e.g., a cell phone, a PDA, a tablet, etc.), where the user device is configured to send and receive user input. The user device may be configured to display information via a display, where the information may be one of a status, command, mode, etc. The user device may be operably coupled to the engine control module 670, the battery control module 660, and the light control module 680. In some embodiments, the user may send a command to a mobile device, where the mobile device may be operably coupled to the controller 608 and located remotely from the light tower (e.g., within 1 mile of the light tower, within 5 miles of the light tower, etc.). In such an embodiment, the mobile device is operably coupled to a mobile application, where the mobile application is configured to communicate with the light tower. The user device may be operably coupled to the engine control module 670. Specifically, the engine control module 670 may receive an "engine off" command from the user device, where the engine control module 670 sends the command to the engine 102 to turn the engine off. Accordingly, the engine control module 670 may receive an "engine on" command from the user device, where the engine control module 670 sends the command to the engine 102 to turn the engine on.

The controller 608 may be operably coupled to the fuel tank, where the fuel tank sensor provides the status to the controller 608. The controller 608 may provide the fuel tank status to the user device. In some embodiments, the user device may be operably coupled to the fuel tank, where the fuel tank provides the status directly to the user device. The user device may be configured to receive the fuel tank status (e.g., low fuel status, etc.) and display the status on the display.

The electrical system 600 may be operably coupled to a plurality of motors, where the plurality of motors are configured to control a position of the lights 144 and the mast 136. The light tower 100 may include a motion sensor positioned proximate the lights 144 and configured to detect motion within a field of view. The detected motion may be sent to the controller 608, and the controller 608 may be configured to actuates the lights 144 and/or the mast 136 to control a position of the lights 144 and the mast 136.

According to an exemplary embodiment, the engine 102 may include an accelerometer sensor configured to provide an acceleration signal indicative of acceleration of the light tower 100. The accelerometer sensor may be coupled to the controller 608, where the controller 608 provides the acceleration signal to the user device. The controller 608 may determine if the acceleration signal has changed in a manner indicative of the light tower 100 stopping movement and, in response to that determination, not send an engine-on signal to the engine 102 to start the engine 102 until a ready-to-start signal is received from the user device. In some embodiments, the engine 102 may include a geolocation sensor (e.g., a GPS sensor) configured to detect a position of the light tower 100. The accelerometer sensor and the geolocation sensor may cooperatively communicate to determine at least (a) a location of the light tower 100, (b) a motion of the light tower 100, and (c) a status of the light tower 100. For example, based on feedback from the accelerometer sensor and the geolocation sensor, the controller 608 may inhibit starting of the engine 102 if the light tower 100 is in a storage location or if the light tower 100 is in motion. In some embodiments, the user may be required to validate the status of the light tower 100 via the user device before the controller 608 may actuate the light tower 100.

Figure 8:
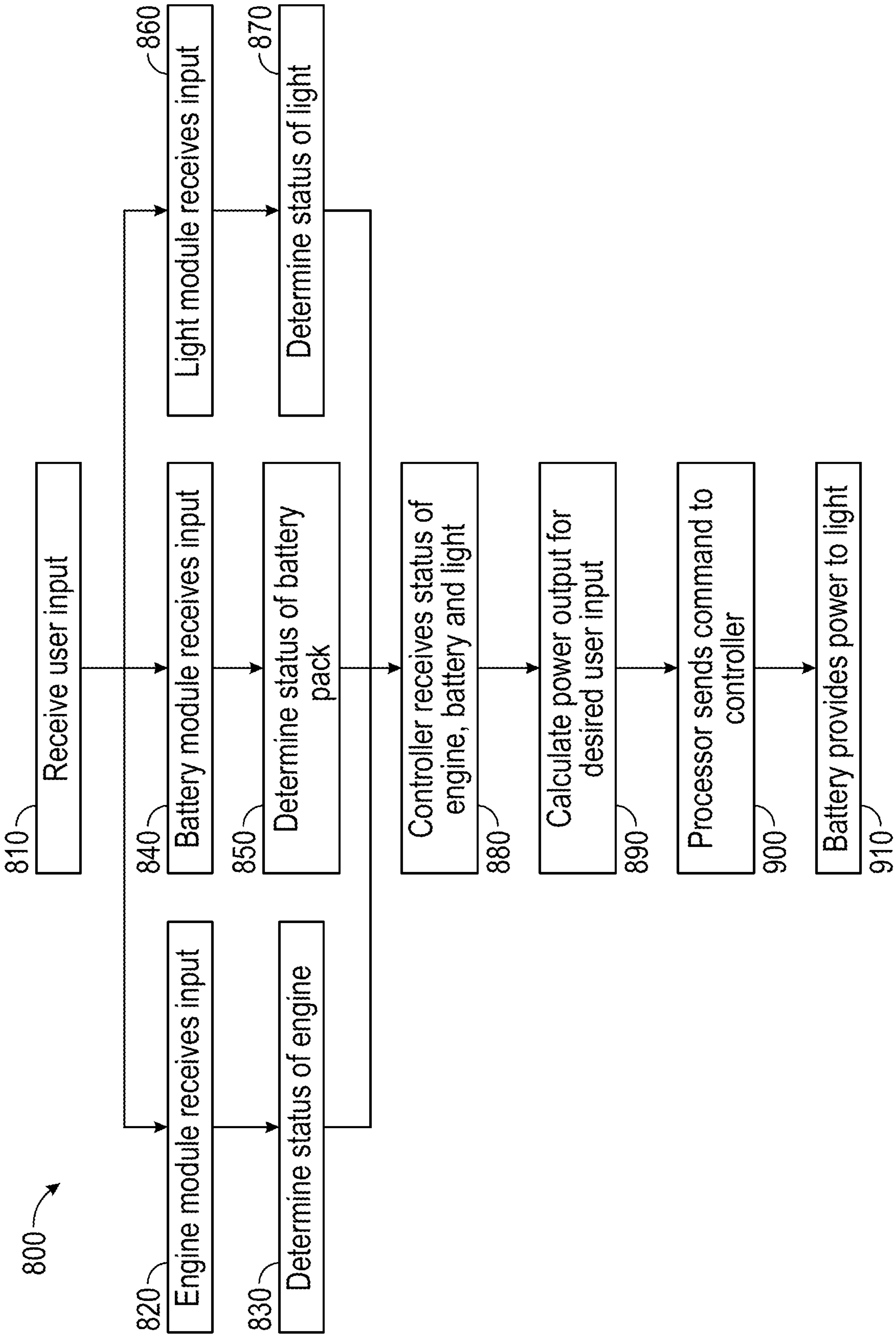
FIG. 8 is a flow chart of a method of controlling the light tower of FIG. 1, according to an exemplary embodiment.

Referring now to FIG. 8, the light tower 100 may be controlled by a control system in a method 800. At step 810, a command from a user input is received (e.g., via input to the display 160 or a user device). In some embodiments, the command from the user is received by the controller 608. The command from the user received at step 810 may be at least one of (a) a constant mode, (b) a photovoltaic mode, and (c) a timer mode. According to an exemplary embodiment, the light tower 100 may include more operating modes than what is disclosed herein. The constant mode may be a mode where the lights 144 are constantly in an "on" position and constantly drawing power from an engine 102 and a battery pack 500. A status of the environment may be determined in the photovoltaic mode (e.g., day, night, etc.). The timer mode may be a mode where an input is received (e.g., at the controller 608) for a desired runtime and the lights 144 are operated for the desired run time.

The command from the user at step 810 may be simultaneously sent to at least an engine control module 820 (e.g., the engine control module 670), a battery control module 840 (e.g., the battery control module 660), and a light control module 860 (e.g., the light control module 680). The engine control module 820 then receives the user input 810 and determines an engine status 830. The engine status 830 may be a status, orientation, position, power output, or the like. By way of example, the engine control module 820 may be operably coupled to a one or more engine sensors that are configured to send and receive engine status data (e.g., an engine power output based on an engine speed and an engine torque). Specifically, the engine control module 820 may receive an "engine-off" command from the user device (e.g., a cell phone, a PDA, a tablet, the display 160) and send the command to the engine 102 to turn the engine off. The engine control module 820 may also receive an "engine-on" command from the user device and send the command to the engine 102 to turn the engine on.

The battery control module 840 may receive the user input 810 and determine a battery status 850. The battery status 850 may be an amount of power currently held within the battery pack 500, a current power output of the battery pack, or the like. In some embodiments, the battery control module 840 may be operably coupled to a one or more battery sensors or a battery management system that is/are configured to send and receive the battery status data. The one or more battery sensors may be coupled to the battery pack 500.

The light control module 860 may receive the user input 810 and determine a light status 870. The light status 870 may be an amount of power currently outputted to the lights 144 (e.g., power consumption of the light), a position of the lights 144, an orientation of the lights 144, an environmental status (e.g., daytime, nighttime, weather conditions, etc.), a number of lights 144 using power, or the like. In some embodiments, the light control module 860 may be operably coupled to a one or more light sensors that are configured to send and receive the light status data. The light sensors may be ambient light sensors configured to determine an ambient light in an environment. The one or more light sensors may be coupled to an outer surface of the light assemblies 140.

The engine status 830, battery status 850, and light status 870 may be simultaneously sent to the controller 608 at step 880. In some embodiments, the controller 608 may be configured to calculate an required battery pack output based on status data from the engine status 830, battery status 850, and light status 870 along with the desired user input 810. For example, if the user selects the "timer mode," the controller 608 determines how much power needs to be outputted to the lights 144 to run for a desired length of time and use the status data from the engine status 830 and the battery status 850 to calculate how much power will be outputted from the engine 102 and the battery pack 500.

Once the controller 608 has calculated the required light output, the controller 608 may send a command at step 900 to the engine 102 to output a desired amount of DC power. In some embodiments, the battery pack 500 is the main power output system for the lights 144 and the engine is the secondary power output system for the lights 144. In some embodiments, the engine 102 is the main power output system for the light 144 and the battery pack 500 is the secondary power output system for the lights 144. In still some embodiments, the battery pack 500 and the engine 102 output substantially equivalent amounts of DC power to the lights 144. Once the command at step 900 is sent to the engine 102, the battery pack 500, the engine 102, or both the battery pack 500 and the engine 102 provide a desired power to the lights 144 at step 910.

In some embodiments, the controller 608 is configured to selectively control operation of the engine 102, the permanent magnet generator 106, and the battery pack 500 to automatically control the operating status of each component. For example, the controller 608 may be configured to turn the battery pack 500 into an off position, where no power output is provided to the lights 144, to charge the battery pack 500, and the engine 102 supplies all the power to the lights 144 and to charges the battery pack 500.

As utilized herein with respect to numerical ranges, the terms "approximately," "about," "substantially," and similar terms generally mean+/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., “top,” “bottom,” “above,” “below”) are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the light tower 100 as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A hybrid light tower, comprising:

an engine;

a permanent magnet generator configured to be driven by the engine, wherein the generator is configured to produce a first DC power;

a battery pack including a plurality of lithium-ion battery cells, the battery pack directly electrically coupled to the generator to receive the first DC power from the generator to charge the battery pack;

an extendible mast configured to move between a lowered position and a raised position; and a light assembly including a plurality of light emitting diodes, the light assembly coupled to the mast and the light emitting diodes electrically coupled to the battery pack to receive a second DC power from the battery pack;

wherein the light tower does not include a battery charger connected to the battery pack.

2. The hybrid light tower of claim 1, wherein the light tower does not include a DC to AC converter.

3. The hybrid light tower of claim 1, further comprising a controller in communication with the engine, the battery pack, and the light assembly, the controller being configured to:

receive an available power output from the battery pack;

determine if the available power output is less than a commanded power consumption of the light assembly; and upon determining that the available power output is less than the commanded power consumption of the light assembly, instruct the engine to increase speed and thereby increase the first DC power provided by the generator.

4. The hybrid light tower of claim 3, wherein the controller is further configured to:

upon determining that the available power is greater than the commanded power consumption of the light assembly, instruct the engine to maintain speed.

5. The hybrid light tower of claim 3, wherein the controller is further configured to:

upon determining that the available power is greater than the commanded power consumption of the light assembly, instruct the engine to turn off and power the light assembly solely with the battery pack.

6. The hybrid light tower of claim 3, wherein the controller is further configured to:

upon determining that the available power is less than the commanded power consumption of the light assembly, instruct the battery pack to stop supplying the second DC power to the light assembly and power the light assembly solely with the engine and the generator.

7. The hybrid light tower of claim 1, further comprising:

an engine sensor configured to output a speed of the engine;

a user device or display configured to receive inputs from a user; and a controller in communication to the user device or display and configured to:

receive the speed of the engine from the engine sensor;

determine an amount of power output needed from the battery pack; and determine an engine speed required to reach the desired power output.

8. The hybrid light tower of claim 1, further comprising:

a controller in communication with the engine, the battery pack, and the light assembly, the controller being configured to:

receive a power output of the engine;

receive a power output of the battery pack;

control a power output to the light assembly based on the power output of the engine and the power output of the battery pack; and calculate the power output to the light assembly to run the light assembly for a desired runtime, in response to receiving an input of the desired runtime from a display.

9. A hybrid light tower, comprising:

an engine;

a permanent magnet generator configured to be driven by the engine, wherein the generator is configured to produce a DC power;

a battery pack including a plurality of lithium-ion battery cells;

a mast;

a light assembly including a plurality of light emitting diodes, the light assembly coupled to the mast and the light emitting diodes electrically coupled to the battery pack to receive power from the battery pack, the generator, or both the battery pack and the generator; and a controller in communication with the engine, the battery pack, and the light assembly, the controller being configured to:

receive an available power output from the battery pack;

determine if the available power output is less than a commanded power consumption of the light assembly; and upon determining that the available power output is less than the commanded power consumption of the light assembly, instruct the engine to increase speed and thereby increase the DC power provided by the generator.

10. The hybrid light tower of claim 9, wherein the controller is further configured to:

upon determining that the available power is greater than the commanded power consumption of the light assembly, instruct the engine to maintain speed.

11. The hybrid light tower of claim 9, wherein the controller is further configured to:

upon determining that the available power is greater than the commanded power consumption of the light assembly, instruct the engine to turn off and power the light assembly solely with the battery pack.

12. The hybrid light tower of claim 9, wherein the controller is further configured to:

upon determining that the available power is less than the commanded power consumption of the light assembly, instruct the battery pack to stop supplying the second DC power to the light assembly and power the light assembly solely with the engine and the generator.

13. The hybrid light tower of claim 9, wherein the controller is further configured to:

receive a power output of the engine;

control a power output to the light assembly based on the power output of the engine and the available power output of the battery pack; and calculate the power output to the light assembly to run the light assembly for a desired runtime, in response to receiving an input of the desired runtime from a display.

14. The hybrid light tower of claim 9, wherein the battery pack is directly coupled to the generator so that the generator is configured to directly charge the battery pack without a battery charger being connected to the battery pack.

15. A hybrid light tower, comprising:

an engine;

a permanent magnet generator configured to be driven by the engine, wherein the generator is configured to produce a first DC power;

a battery pack including a plurality of lithium-ion battery cells, the battery pack directly electrically coupled to the generator to receive the first DC power from the generator to charge the battery pack;

an extendible mast configured to move between a lowered position and a raised position;

a light assembly coupled to the mast and including a plurality of light emitting diodes; and a controller in communication with the engine, the battery pack, and the light assembly, the controller being configured to selectively supply a second DC power to the light emitting diodes from the battery pack, the generator, or both the battery pack and the generator.

16. The hybrid light tower of claim 15, wherein the controller is further configured to:

receive an available power output from the battery pack;

determine if the available power output is less than a commanded power consumption of the light assembly; and upon determining that the available power output is less than the commanded power consumption of the light assembly, instruct the engine to increase speed and thereby increase the first DC power provided by the generator.

17. The hybrid light tower of claim 15, wherein the controller is further configured to:

upon determining that the available power is greater than the commanded power consumption of the light assembly, instruct the engine to maintain speed.

18. The hybrid light tower of claim 15, wherein the controller is further configured to:

upon determining that the available power is greater than the commanded power consumption of the light assembly, instruct the engine to turn off and power the light assembly solely with the battery pack.

19. The hybrid light tower of claim 15, wherein the controller is further configured to:

upon determining that the available power is less than the commanded power consumption of the light assembly, instruct the battery pack to stop supplying the second DC power to the light assembly and power the light assembly solely with the engine and the generator.

20. The hybrid light tower of claim 15, wherein the battery pack is directly coupled to the generator so that the generator is configured to directly charge the battery pack without a battery charger being connected to the battery pack.

* * * * *